United States Patent
Smyros et al.

(10) Patent No.: US 9,652,499 B1
(45) Date of Patent: May 16, 2017

(54) SEARCH-BASED RECOMMENDATION ENGINE

(71) Applicants: Athena Ann Smyros, Richardson, TX (US); Constantine John Smyros, Richardson, TX (US)

(72) Inventors: Athena Ann Smyros, Richardson, TX (US); Constantine John Smyros, Richardson, TX (US)

( * ) Notice: Subject to any disclaimer, the term of this patent is extended or adjusted under 35 U.S.C. 154(b) by 0 days.

(21) Appl. No.: 14/465,524

(22) Filed: Aug. 21, 2014

Related U.S. Application Data

(60) Provisional application No. 61/868,091, filed on Aug. 21, 2013.

(51) Int. Cl.
G06F 17/30 (2006.01)

(52) U.S. Cl.
CPC .............................. *G06F 17/30477* (2013.01)

(58) Field of Classification Search
CPC .................................................. G06F 17/30477
USPC .......................................................... 707/771
See application file for complete search history.

(56) References Cited

U.S. PATENT DOCUMENTS

| 8,788,258 B1* | 7/2014 | Bangalore ............ G11B 27/105 704/2 |
| 2010/0042588 A1* | 2/2010 | Smyros et al. .................... 707/3 |
| 2014/0365468 A1* | 12/2014 | Ormont ............ G06F 17/30864 707/722 |

* cited by examiner

*Primary Examiner* — Mark E Hershley
(74) *Attorney, Agent, or Firm* — Slater Matsil, LLP

(57) ABSTRACT

The embodiments determine the recommendations for a search term and its criteria, whereby a threshold is used for accepting a result, whether it is a document, message, file, or any other form of communication. The input may be part of a larger repository, and there is no restriction on how many documents constitute the returned recommendation set.

18 Claims, 2 Drawing Sheets

SEARCH-BASED RECOMMENDATION ENGINE

RELATED APPLICATIONS

This application claims priority from Provisional Application No. 61/868,091, "RECOMMENDATION ENGINE", filed 21 Aug. 2013, the disclosure of which is hereby incorporated herein by reference.

BACKGROUND

Currently, a myriad of communication devices are being rapidly introduced that need to interact with natural language in an unstructured manner. Communication systems are finding it difficult to keep pace with the introduction of devices as well as the growth of information.

BRIEF DESCRIPTION OF THE DRAWINGS

The accompanying drawings are incorporated in and are a part of this specification. Understanding that these drawings illustrate only typical embodiments of the invention and are not therefore to be considered to be limiting of its scope, the invention will be described and explained more fully through the use of these accompanying drawings in which.

DETAILED DESCRIPTION OF THE INVENTION

Figure 1:
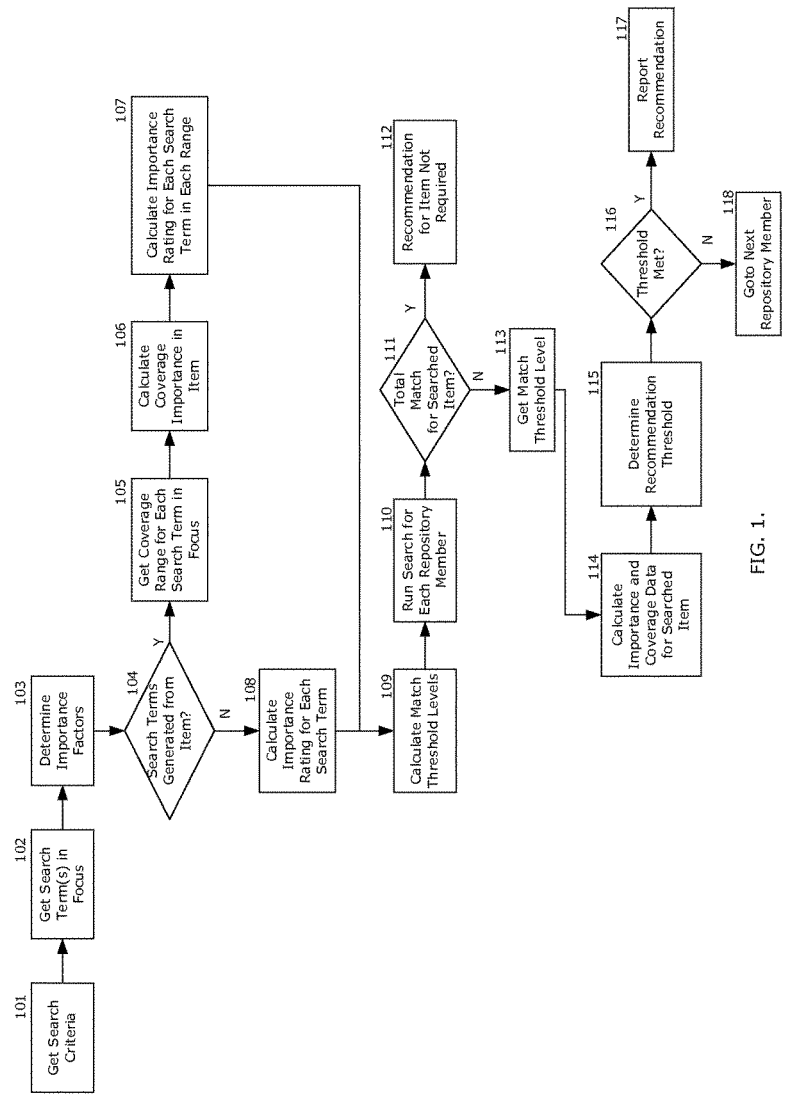
FIG. 1 illustrates an example of an Omission Detection Process that is usable with the embodiments described herein.

The embodiments described herein determine the recommendations for a search term and its criteria, whereby a threshold is used for accepting a result, whether it is a document, message, file, or any other form of communication. The input may be part of a larger repository, and there is no restriction on how many documents constitute the returned recommendation set. A threshold can be defined for both numeric and non-numeric values that are found in a normal search term. For instance, if a search term is equal to "find a cow that produces 10 gallons of milk a day", a recommendation engine could be employed when 9.99 is acceptable or 9.1 is acceptable, where this is very close to the threshold but doesn't constitute an exact match within the range or one that would numerically round up to 10.

Another use of a recommendation engine is the ability to determine language-based thresholds that do not equate to a numerical term. For instance, there are a set of characteristics that are in a document that can be used to separate one product from another, such as "prefer a hair dryer with a diffuser and a curler option". The repository used to analyze the search term then is analyzed for the content that relates to characteristics that would allow the system to recommend a set of products that had similar characteristics to the input, even if they are not an exact match (i.e., as in matching the words like a Boolean search).

In other implementations, when a threshold or set of thresholds are used to match a set of search terms, such as those generated from a focus message or text stream, then what constitutes a close match may be useful for the viewer of search results. In yet another implementation, the ability to match one or more groups of search terms, such as those grouped by date, topical, location or other grouping variable, may be of interest to the searcher and can be reported with each such repository member that exhibits these characteristics. A key feature of these types of implementations is that the focus can be analyzed in realtime without prior knowledge of what types of focus will be brought into the system.

A search term that is usable with the embodiments may be comprised of one of any number of term units that make up a text stream for a given search application. There is no limitation on the number of search terms. It is possible that the search term itself is a document, file, message, etc. There is for most implementations no need for an arbitrary limit on the length of the search term, such as the number of words that make up the search term. In addition, the search term may or may not be fully grammatical in nature; meaning it can be a sentence, paragraph, or other language-based input as well as a bucket of words.

Criteria includes items used by the search engine to determine the usability of the search, such as using documents before/after a certain date, topics that should be included/excluded within the search, an authority or author list that should be used to return the results, etc. Any such criteria may also be directly expressed within a language-based search request. For instance, it would be possible to derive the topics used within a search term paragraph so that only those topics are considered for the remaining search terms, such that, for example, the topic "husky" within the paragraph generates a list of search terms related to it. The result then pulls up only the dog but not people with a deep voice.

Initially to start the system, the repository and the search criteria, including the search term and any additional criteria are available. The search criteria 101 may either be passed to the system, calculated based on the search term itself, or calculated based on their rating used for search results. At a minimum, the characteristics of the search term and the repository are important in order for a search criteria to be discovered. In some cases, a criteria may be shipped with a search term; this requires the system to be able to determine the features from the criteria that affect their rating. For instance, if a search result is ranked based on the frequency of the term in a message, is an exact match being measured in the rankings or can similar terms, such as synonyms, be included as part of the search results.

It may also be that a system will require filtering to remove repository members before any search terms are analyzed. Also, depending on implementation, it may be necessary to calculate the criteria using language terms. For example, a search term is equal to "the new family dog should be at least two years old". The search criteria in this case is based on the use of the comparison "at least two years old". In this case, the criteria is for the family dog, the subject of the sentence. When such search term analysis is required, the implementation should contain a grammatical analyzer of some kind in order to calculate such information, an example of which is shown in U.S. application Ser. No. 13/625,784, entitled "NATURAL LANGUAGE DETERMINER", filed 24 Sep. 2012, the disclosure of which is hereby incorporated herein by reference in its entirety.

At this point, determining the range of search term(s) in focus 102 can be used. If a general search is used, the range of search terms can be all the terms of a particular language or languages; the importance is based on language-based measures. There are many ways to generate search terms. A general method is outlined in U.S. application Ser. No. 13/402,775, entitled "SYSTEMS AND METHODS UTILIZING A SEARCH ENGINE", filed 22 Feb. 2012, the disclosure of which is hereby incorporated herein by reference in its entirety. Other implementations may be based on a specific language, some can be related to a specific range of possible uses for the search implementation.

Another way is when a focus document is being used, and search terms are derived from such a document. This means that there are features of the document that can be measured to determine how important one search term is over another. Common measures include frequency, grammar function, headings, etc., and these can be examined in terms of the rankings and calculated for what is considered important 103. For instance, if a single search term contains a single object, then the ranking of that search term is based on the importance of the object in a repository member. If multiple search terms are used within a particular implementation, then the relation between the search terms, such as how they are related to each other using an external measure like a topic, can be used to determine the importance factors.

Other relations are possible if the search terms are derived from a focus document, such as determining requirements matching or determining what set of files should be used to solve a particular problem, as in the medical field where a diagnosis is being searched against a repository of medical experiences. The output of 103 is the basis for determining the number of search terms within the focus. Those terms that were found to be important comprise the search term list. The inclusion of any criteria into the search term list can be done based on implementation requirements; if an implementation cannot recognize topics when analyzing the search term and criteria, for instance, then the topics should be included as search terms and any analysis based on the documents would have to be done by non-grammatical means. If, however, the implementation can support such grammatical analysis, then these would generally be used as a discriminator and not as a general search term based on the focus.

If any search terms are generated from a focus item or set of items 104, then a variety of optional tasks can be performed. First, the coverage range 105 can be determined. A coverage range indicates an interval, the number of terms (such as words, numbers, symbols, etc.) that are related to a unique term set; as an example, a topic is being discussed for five paragraphs in an input. A coverage range may include any number of characteristics, such as the frequency of the individual search term within the focus item, the locations in where these are found, such as they are found in a particular area of the item like a text stream or document and not in others.

Other coverage measures include paragraphs that the search term is in, sentences the search term is in, etc. For more grammatical measures, the objects that are covered under a specific subject refers to the fact that they are either modifying the subject in some way or indicating a characteristic of the subject, making them in the subject's coverage range. Topics and other information that have an associated interval may also be used to determine a coverage range. The coverage range within an item set needs to be established for each item found to be related to a more important term, usually measured in words.

Once the coverage range is known, the optional calculation to determine coverage importance 106 may be used. The importance of the range may be determined by looking at the number of words that are in the range based on the entire size of the item set, where they occur, and where the grammatical relations that indicate the coverage range is important, such as it is related to a main topic in the document versus being related to a smaller subtopic in a document or message.

Then, the importance rating for each search term in each range the search term is found in the focus item can be optionally calculated 107. Importance ratings are needed when there are multiple search terms and they are in some language construction, like a sentence, and not a simple bag of words. For instance, if a term is related to the subject of a sentence versus when the search term is a direct object will have different ratings. A rating can be linear or more heavily weight one instance, such as a subject, more than the direct object.

If the result of 104 is negative, then the importance rating calculation for each search term possibility is calculated 108. In some cases, this is a language-based calculation, based on some division based on grammar, or it may be based on the reason for the search to be performed, as when an implementation is being used by a particular device that is only interested in search terms that it can respond to and will ignore the rest. If only a single search term is possible, then any values that can be applied, including language measures, that are possible with the search term can be used. For instance, if a search term is being used to operate a device, such as find all the CDs that are available in a CD jukebox at a point in time, then the search term is limited to possible titles, and may not include other features of a language that are not used to generate a title.

Regardless of the use of a focus item or a larger set of possible search terms based on language constraints, the calculation to find matching threshold levels is performed next 109. The threshold levels are based on the initial search criteria, coverage, and importance ratings, that go into how the final search ranking is formed and at what level is an appropriate match deemed possible.

In some cases, this may also be affected by the types of search allowed. If an exact search is required, then the threshold of a match may be the frequency of how many times the exact phrase "dog store" for instance is found in a repository member. In other cases, where similarities of search terms are allowed, such as synonyms, then the threshold may be affected by the closeness of the similarity and how many words in the search term have a similarity used to find the term within a repository member.

Still other ratings may be based on focus item usage, and therefore, the rating may be the number of search terms that are found in the repository member, their importance ratings, and the completeness of the search terms found. For instance, if the search term set allowed similarity measures, and some of the uses of the search term in the repository member only contained the similar forms, then that item may be rated differently. If the importance rating of one search term is higher than another search term, and the presence or absence of that search term from a focus item with the higher importance rating will more affect the search rating, and therefore need to be taken into account when calculating the threshold level. The threshold level itself is then a set of formulas that indicate what the acceptable return should look like.

Up to this point, the emphasis has been on the input to properly characterize the search terms so that a recommendation calculation may be made. Now, a search can be run 110 for each repository member. The repository member may be from a previous search (if the search engine is separate from the system) or the system performs one search and calculates the recommendation if there is sufficient information to warrant the calculation. For each repository member, each search term is plugged into a threshold formula set to determine the total match for the searched repository member 111.

If there is a total match, meaning that all the terms were in the repository member, and had the correct information ratings, then the repository member is considered a total match and a recommendation for the repository member is not required 112.

However, if there is not a perfect match, then the threshold level may be recalculated in the optional function to get the match threshold level 113. This means that characteristics about the repository member may alter the search rankings and therefore may alter the threshold level for a particular repository member. These may include document type, such as a word-processing document versus a spreadsheet, and other such values.

For any searched document, the importance and coverage data may be measured 114 if the implementation requires it. This refers to establishing the search term's placement in the search document for each instance, then determining its coverage and importance, as was done for the search term when it is part of a focus item. This can include language features, grammatical features, statistical features, and other such features that determine the importance of the search term(s) within the repository member, independent of their importance within the focus item that generated the search terms, for instance.

With this information, the repository member can have its recommendation threshold determined 115. The threshold takes into account all the calculated match threshold levels as indicated in 109 and solved using the information that has been obtained from the repository member. This is normally a single value or set of values that can be ranked in some linear order to determine what the cutoff level is for a recommended search; this means that some information that is in the search term(s) is not responsive within the repository member. For instance, all the terms with high importance ratings are in the repository member with similar high importance ratings, but few of the less importance ratings are found.

If the coverage of the important terms are also sufficiently high, then it is possible that the threshold has been met for a recommendation. If the calculations indicate that the threshold has been met 116, then the recommendation can be reported 117. The reporting may be in the form of text, may be presented in graphical form, or may be presented in a multimedia form including speech. The reporting may contain the features that caused the repository member to pass, such as what search term(s) were found to be responsive and their importance. If it does not meet either the initial threshold or the recommendation threshold, then the next repository member is considered 118.

The use of a recommendation engine is commonly associated with marketing and sales functions within an enterprise so that if a product closely but does not meet all the specifications of a request, the product can still be referred to the customer. It may be that the price is lower, it has a better rebate, or it may have a better characteristic than the search term originally indicated or may contain a feature with better parameters that the customer is actually more interested in, even at the exclusion of other features. A fixed threshold will not capture all such variations and that would cause the customer to miss making a buy decision.

Another closely related use of thresholds is when a requirements document is being used as the search term, and there is unlikely any repository member that matches the entire requirements search term list. In this case, the importance of each search term is critical for the recommendation engine, since a fixed threshold based on preset rules would require presetting the rules for every requirements document. This is especially so when grammatical analysis is not done for the initial search and the system is using the results of another engine's search and needs to be used by the recommendation engine to generate an accurate reflection of the most important search terms that should be recommended, even if some minor ones are missing.

Another example of a use of a recommendation engine is in planning a project. If a project is defined by one or more scope documents, each scope document can be analyzed to locate the search criteria, the search terms, and the importance factors. Once these have been obtained, and if there are search terms generated from the input, then the coverage range can be found for each search term in the current scope document. In this example, a topic is located for each search term in the focus, so that the search term can be placed in the correct context by using the topic to remove search results from a repository that do not belong. This is helpful when a planning document contains common terms like work, project, and others that require more information for the recommendation to be meaningful. Then, importance calculations take place.

While it is usually considered a better match when everything matches exactly, in most real-world applications, there is never going to be perfect match for every requirement. As a result, determining what is considered more important helps the system evaluate a repository member. Once the importance ratings have been established, then the final item is to determine the threshold based on a search type. In this example, an object search type is employed that has a threshold that considers a search term to be an object and considers a match to be a substantially similar term, even if it is not worded the same (such as Jack's house, the house that Jack lives in would be considered similar enough to meet the threshold).

With this information, the recommendation engine now has enough information to examine each repository member that constitutes the range of documents that comprise the repository. In this example, there has been no search run first, so the recommendation engine works with the search engine to remove documents that do not contain enough information to be considered remotely a match. In this case, a repository member is analyzed by the search engine to see if there is enough similarity between the focus search terms and the repository member search terms, using a keyword filter in this case. If no terms were found the repository member, then the next repository member is found. Depending on the threshold set for search, then any repository member that comes close but is not an exact match with the focus will be passed to the recommendation engine to determine if the repository member contains enough important search terms based on their importance ratings as allowed by the threshold (such as the wording example given above), then the repository member is considered to be in the recommended state and can be passed to the user. If a repository member does not contain enough important information, then it is not in the recommended state and is not passed to the user.

Figure 2:
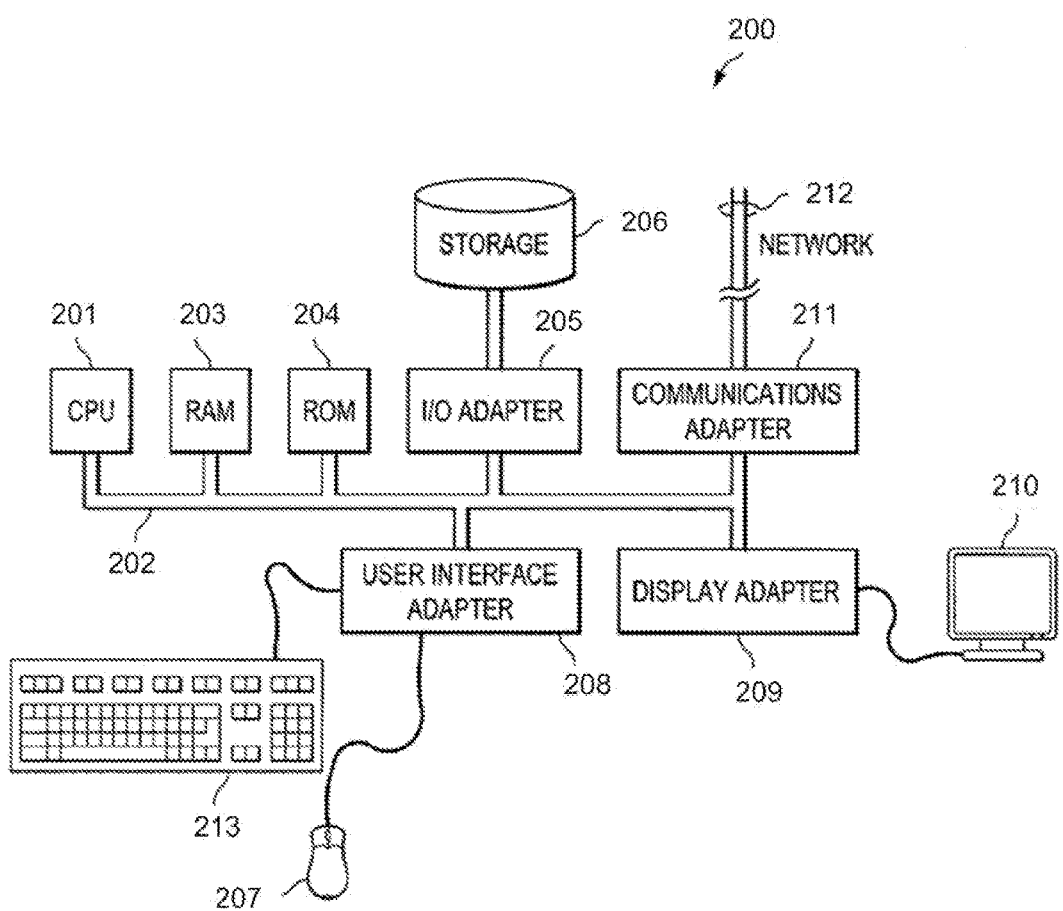
FIG. 2 depicts a block diagram of a computer system which is adapted to use the present invention.

FIG. 2 illustrates computer system 200 adapted to use the present invention. Central processing unit (CPU) 201 is coupled to system bus 202. The CPU 201 may be any general purpose CPU, such as an Intel Pentium processor. However, the present invention is not restricted by the architecture of CPU 201 as long as CPU 201 supports the operations as described herein. Bus 202 is coupled to random access memory (RAM) 203, which may be SRAM, DRAM, or SDRAM. ROM 204 is also coupled to bus 202, which may be PROM, EPROM, or EEPROM. RAM 203 and ROM 204 hold user and system data and programs as is well known in the art.

Bus 202 is also coupled to input/output (I/O) controller 205, communications adapter 211, user interface 208, and display 209. The I/O adapter card 205 connects to storage devices 206, such as one or more of flash memory, a hard drive, a CD drive, a floppy disk drive, a tape drive, to the computer system. Communications 211 is adapted to couple the computer system 200 to a network 212, which may be one or more of a telephone network, a local (LAN) and/or a wide-area (WAN) network, an Ethernet network, and/or the Internet network. User interface 208 couples user input devices, such as keyboard 213, pointing device 207, to the computer system 200. The display card 209 is driven by CPU 201 to control the display on display device 210.

Note that any of the functions described herein may be implemented in hardware, software, and/or firmware, and/or any combination thereof. When implemented in software, the elements of the present invention are essentially the code segments to perform the necessary tasks. The program or code segments can be stored in a computer readable medium. The "computer readable medium" may include any physical medium that can store or transfer information. Examples of the processor readable medium include an electronic circuit, a semiconductor memory device, a ROM, a flash memory, an erasable ROM (EROM), a floppy diskette, a compact disk CD-ROM, an optical disk, a hard disk, a fiber optic medium, etc. The code segments may be downloaded via computer networks such as the Internet, Intranet, etc.

Embodiments described herein operate on or with any network attached storage (NAS), storage array network (SAN), blade server storage, rack server storage, jukebox storage, cloud, storage mechanism, flash storage, solid-state drive, magnetic disk, read only memory (ROM), random access memory (RAM), or any conceivable computing device including scanners, embedded devices, mobile, desktop, server, etc. Such devices may comprise one or more of: a computer, a laptop computer, a personal computer, a personal data assistant, a camera, a phone, a cell phone, mobile phone, a computer server, a media server, music player, a game box, a smart phone, a data storage device, measuring device, handheld scanner, a scanning device, a barcode reader, a POS device, digital assistant, desk phone, IP phone, solid-state memory device, tablet, and a memory card.

What is claimed is:

1. A computer program product comprising a non-transitory computer-readable medium having computer program logic recorded thereon for producing a recommendation report based on search criteria, comprising:
   code for receiving a search request from an originator for locating members of a repository;
   code for generating search terms of the search criteria from the search request using deterministic grammatical analysis;
   code for determining a first coverage range for each search term in the search request, the first coverage range indicating a frequency that each search term is used in the search request;
   code for calculating a first importance rating for each search term based on the first coverage range;
   code for determining match levels between the search terms and the members of the repository, the match levels for each member of the repository being based upon the first coverage range and the first importance rating for each search term found in each respective member of the repository; and
   code for returning the match levels as the recommendation report to the originator.

2. The computer program product of claim 1, wherein the search request comprises a document, the document comprising multiple sentences.

3. The computer program product of claim 1, wherein calculating the first importance rating uses deterministic grammatical analysis.

4. The computer program product of claim 3, wherein search terms that are an object of a sentence are provided a different importance rating than search terms that are a subject of a sentence.

5. The computer program product of claim 1, wherein calculating the first importance rating is determined at least in part by a number of words in the first coverage range for the corresponding search term compared to a number of words in search request.

6. The computer program product of claim 1, wherein calculating the first importance rating is determined at least in part by determination of whether the corresponding search term is a topic or a sub-topic in the search request.

7. The computer program product of claim 1, further comprising code for determining a second importance rating for each search term found in a document of the repository.

8. The computer program product of claim 1, further comprising code for determining a second coverage range for each search term found in a document of the repository.

9. The computer program product of claim 8, further comprising code for determining a second importance rating for each search term found in a document of the repository.

10. A computer program product comprising a non-transitory computer-readable medium having computer program logic recorded thereon for producing a recommendation report based on search criteria, comprising:
    code for receiving a search request, the search request comprising a plurality of sentences;
    code for generating search terms using deterministic grammatical analysis of the plurality of sentences;
    code for determining a first coverage range for each search term in the search request, the first coverage range indicating a frequency that each search term is used in the plurality of sentences;
    code for calculating first importance rating for each search term based on the first coverage range; and
    code for determining a match level for the search terms in a document in a repository, the match level being based on the first coverage range and the first importance rating.

11. The computer program product of claim 10, further comprising code for returning the match levels.

12. The computer program product of claim 10, wherein code for calculating the first importance rating uses deterministic grammatical analysis.

13. The computer program product of claim 12, wherein search terms that are an object of a sentence are provided a different importance rating than search terms that are a subject of a sentence.

14. The computer program product of claim 10, wherein calculating the first importance rating comprises determining a number of words in the first coverage range for the corresponding search term compared to a number of words in search request.

15. The computer program product of claim 10, wherein calculating the first importance rating comprises determining whether the corresponding search term is a topic or a sub-topic in the search request.

16. The computer program product of claim 10, further comprising code for determining a second importance rating for each search term found in the document of the repository.

17. The computer program product of claim 10, further comprising code for determining a second coverage range for each search term found in the document of the repository.

18. The computer program product of claim 17, further comprising code for determining a second importance rating for each search term found in the document of the repository.

* * * * *